July 27, 1965 K. H. S. JOHANSEN 3,197,699
ELECTRICAL MOISTURE SENSING DEVICE
Filed March 5, 1964
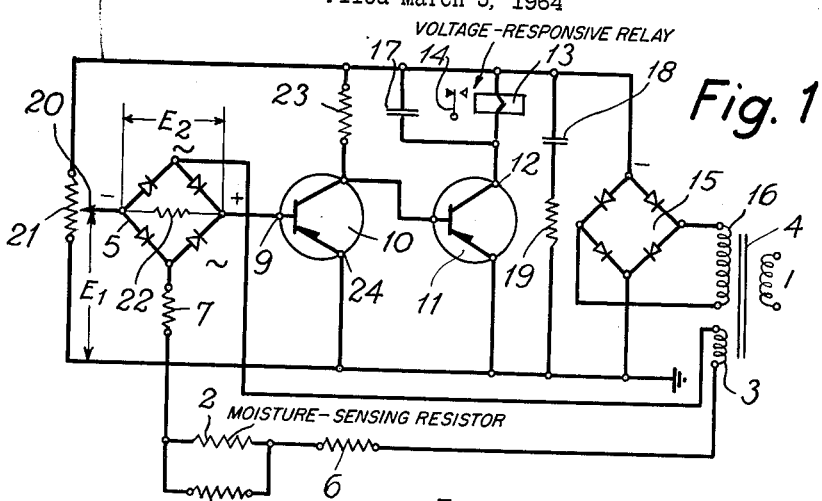
Fig. 1
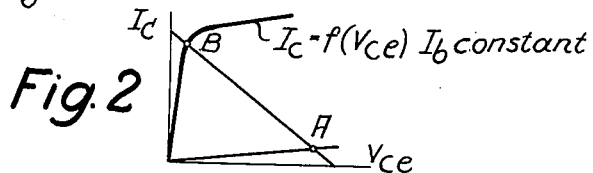
Fig. 2
Fig. 3
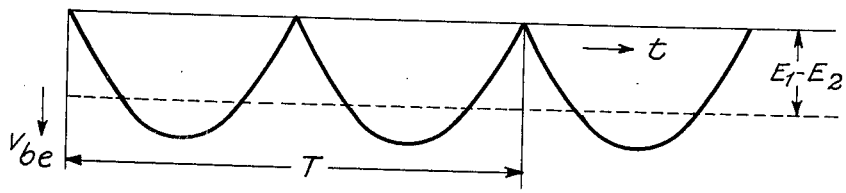
Fig. 4
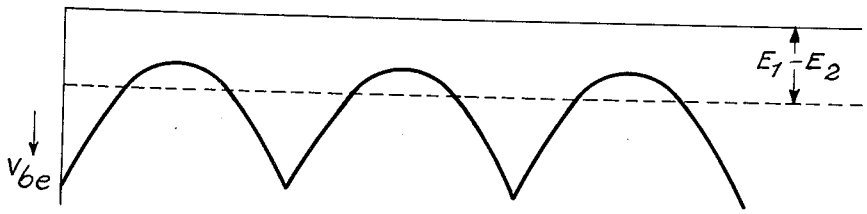
Fig. 5
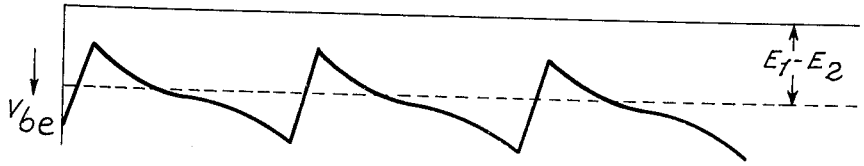

3,197,699
ELECTRICAL MOISTURE SENSING DEVICE
Knud Harald Storm Johansen, Ulkebøl, Sonderborg, Denmark, assignor to Danfoss A/S, Eismark, Nordborg, Als., Denmark, a Danish company
Filed Mar. 5, 1964, Ser. No. 349,639
5 Claims. (Cl. 324—65)

This is a continuation-in-part of my application Serial No. 50,026, filed August 16, 1960 and now abandoned in favor of the present disclosure.

The invention relates to a thermal responsive or moisture sensing electric device of the kind which is supplied with current from a source of alternating current and having at least one electrode or sensor whose electric conductivity varies proportionately with the temperature of the electrode or with water vapor or other liquid vapors absorbed by the electrode.

Devices of the aforesaid kind are known, but they have the drawback that usually there is a constant or pulsating flow of direct current through the sensing electrodes. This causes the electrode to be destroyed in time by electrolysis so that its durability is unsatisfactory and it fails to preserve its electrical properties.

It is the object of the invention to devise a device of the aforesaid kind which is durable and preserves its adjustment and is also of simple construction and therefore very reliable.

An essential feature of a moisture sensing device according to the invention consists in an arrangement in which solely an alternating current flows through the sensing electrode and the amplitude of an alternating voltage is dependent on the conductivity of the electrode. The alternating voltage in the device is rectified and connected in series with a direct current voltage of opposite polarity which is constant or pulsating in time with the rectified alternating voltage to a develop a differential voltage. The differential voltage of the two D.C. voltages is connected to input terminals of a direct current amplifier, the direct current output voltage of the amplifier is supplied to an indicating or measuring instrument for example, a voltage-representative device.

As a result, the thermal responsive and moisture-sensitive electrode is not exposed to any essential attacks by corrosion due to electrolysis. Substantially no current flows through the indicating instrument when the conductivity of the electrode is less than a predetermined value, and further the device is very sensitive to positive changes in the conductivity.

In one embodiment of the device according to the invention the electrode or moisture and temperature sensor is connected to the source of alternating current in series with a rectifier bridge having a negative terminal connected to a tap on a potentiometer connected across a source of direct current derived from the source of alternating current. The source of direct current produces a constant or pulsating direct current voltage, while a positive terminal of the rectifier bridge is connected to the base electrode of a current amplifying transistor whose emitter electrode is connected to the positive pole of the direct current source and whose collector electrode is connected through a dropper resistor to the negative D.-C. junction of the direct current source and to the base electrode of another transistor. The emitter electrode of the other transistor is connected to the positive D.-C. junction of the direct current source and its collector electrode is connected through the indicating instrument to a negative D.-C. junction of the direct current source.

As a result, a negative change, in the conductivity of the electrode, away from the predetermined value whereby the base electrode of the first transistor becomes more negative in relation to its emitter electrode will produce an intense collector current in the first transistor, whereas its collector emitter voltage drops towards zero, whereby the second transistor is blocked and the indicating instrument receives no current. If, however, the change of the conductivity of the electrode away from the predetermined value is positive, whereby the voltage of the base electrode of the first transistor passes towards zero in relation to its emitter electrode, there will not be any substantial collector current in the first transistor, and the collector-emitter voltage would in that case assume a substantial value, whereby the second transistor conducts so that the indicating instrument receives current for indicating the positive change in the conductivity of the electrode.

In another embodiment of the device according to the invention the direct current source has an important internal impedance, in relation to the circuit connected to the direct current source, as a result of which the voltage across a potentiometer will be reduced as soon as a current flows through the indicating instrument, whereby the base emitter voltage in a first transistor drops towards zero at a greater rate so that the second transistor conducts substantially faster, that is, the device obtains a tilting effect and simultaneously substantially greater sensitivity to changes in the conductivity of the electrode.

In a preferred embodiment of the device according to the invention the direct current source is connected in parallel with a smoothing-out condenser and a resistor connected in series with same. The components are so dimensioned that their time constant is $\tau = T/2$, in which T is the cycle of the alternating current used, whereby a suitable form of the current impulses to the input terminals of the direct current amplifier is obtained.

The invention will now be further described with reference to the drawing, in which FIGURE 1 is a wiring diagram of a device according to the invention, FIGURE 2 is a plot of a characteristic of a transistor incorporated in the device, and FIGURES 3–5 are plots of curves for essential voltages developed in the device according to the invention.

FIGURE 1 shows a thermal responsive and moisture-sensing and controlling and measuring device which is energized with current from a source 1 of alternating current such as a supply mains and having at least one moisture sensing sensor or electrode 2 which is constructed in known manner that its electric conductivity varies substantially proportionately either with the temperature or with water vapor or other liquid vapors absorbed in the electrode. The electrode 2 is connected to the alternating current source 1 through a secondary winding 3 of a power transformer 4. A bridge rectifier 5 is connected in series with the electrode 2. A limiting resistor 6 and a series resistor 7 are connected in series with the electrode 2 which is connected in parallel with an adjusting resistor 8. The alternating current through the electrode 2 is rectified by the full-wave rectifier bridge 5, and a positive D.-C. junction of the latter is connected to an input 9 of a direct current amplifier. The amplifier may, as shown, consist of two emitter-grounded cascade-coupled transistors 10 and 11. The first transistor 10 acts as a current amplifier for the second transistor 11 which has connected in series with its collector electrode 12 an indicating instrument or current-responsive device such as an electromagnetic relay 13 having contacts 14 which may be connected to a signal circuit (not shown). It will be appreciated that, alternatively, any type of direct current amplifier whatever may be used in the circuit. Another full-wave rectifier bridge 15 energized with current from another secondary winding 16 of the transformer 4 produces a pulsating direct current voltage and is connected by its negative D.C.

junction to the relay 13 and by its positive D.C. junction to the emitter electrodes of the two transistors 10 and 11. The relay 13 may be connected in parallel with a condenser 17 for smoothing out the direct current pulses transmitted to the relay 13, and across the direct current terminals or junctions of the other rectifier bridge is connected a parallel circuit consisting of a smoothing-out condenser 18 which is in series with a resistor 19. To enable adjustment of a bias for the input terminal 9 of the direct current amplifier 10, 11, the negative D.C. junction of the first rectifier bridge 5 is connected to a displaceable tap 20 of a potentiometer 21 which is connected in parallel with the direct current terminals of the second rectifier bridge 15. Furthermore, the direct current terminals of the first rectifier bridge coupling 5 are connected with each other by means of a load resistor 22. The collector electrode of the first transistor 10 is connected directly to the base electrode of the second transistor 11 and connected to the negative D.-C. junction of the second bridge 15 through a dropper resistor 23.

The device operates as follows:

Between the tap 20 of the potentiometer 21 and a common positive lead for the emitter electrodes and the second bridge there is produced a pulsating direct current voltage $E_1$ during operation of the device. The said pulsating direct current voltage $E_1$ counteracts a pulsating direct current voltage $E_2$ across the load resistor 22, produced by the first bridge 5 and dependent on the conductivity of the electrode or moisture sensor 2. The differential voltage $E_1$ less $E_2$ is supplied to the base electrode 9 of the first transistor and the potential between the base electrode and the emitter electrode will be $V_{be_1} = E_1 - E_2$. Assuming that the resistors incorporated in the circuits are so dimensioned that the value of the potential at the beginning is greater than nil and negative, the first transistor 10 is in a short-circuited condition, whereby the potential $V_{ce}$ between the collector and emitter of the transistor 10 becomes very small, and consequently the potential $V_{be_2}$ between the base and emitter of the coupled second transistor 11 will likewise be very small so that the transistor is in its interrupted condition and its collector current $I_{c_2}$ is very small so that the relay 13 is unable to be attracted. This is illustrated at the point A in FIGURE 2 which shows the collector current $I_c$ of a transistor as a function of $V_{ce}$. This condition will continue if the voltage $E_2$ is reduced thereby and the conductivity of the electrode 2 is reduced, that is, the value of its resistance is increased, for example if the temperature of the electrode is increased, or its absorption of water vapor or other liquid vapors is reduced. In that case $V_{be_1}$ will become more negative and the transistor 10 will still be short-circuited while the transistor 11 will still be blocked, that is, its collector current is still insignificant and cannot operate the relay 13.

If, however, the voltage $E_2$ is increased so the conductivity of the electrode 2 is increased, that is, its resistance value is reduced, for example when its temperature is reduced or its absorption of water vapor or other liquid vapors is increased, the differential voltage $E_1 - E_2$ equal to $V_{be_1}$ will pass towards zero or, as the case may be, become positive. As a result of this the first transistor 10 is in its interrupted or blocked condition and the voltage $V_{ce_1}$ between its collector and emitter is heavily increased and a relatively large negative voltage $V_{be_2}$ is supplied to the base and emitter of the second transistor 11, whereby the transistor is brought into a short-circuited condition, that is, its collector current $I_{c_2}$ becomes great as indicated by the point B in FIGURE 2, and the relay 13 is attracted.

Since the current amplification of the first transistor 10 is relatively great, even a slight increase in the voltage $E_2$, where $V_{be_1}$ is beforehand of low value, will involve a substantial change of $I_{c_2}$, since the working point of the transistor 11 in that case changes from the point A to the point B in FIGURE 2. Conversely, the working point of the transistor 11 will change from the point B to the point A at even a slight reduction of the voltage $E_2$. The device is thus very sensitive to changes in the conductivity of the electrode 2 and so that a positive change in relation to the predetermined value will cause the relay 13 to be attracted, whereas a negative change will cause the relay to drop out.

By means of the potentiometer 21 the voltage $V_{be_1}$ can be adjusted to a low negative value and the switching point of the device thereby adjusted.

By suitable dimensioning of the resistors 6, 7 and 8 it is possible to provide, with due regard to the characteristic of conductivity of the electrode and the constants of the rectifier bridge 5, linear dependence between the conductivity and the collector current in the transistor 11, so that the device can be used as a measuring instrument if the relay 13 is substituted by a pointer instrument with linear scale.

To further improve the sensitivity of the controlling and measuring device the direct current source has in one embodiment according to the invention a considerable internal impedance in relation to the circuits connected to the direct current source, and as a result the voltage across the potentiometer 21 and consequently the value of the voltage $E_1$ will be reduced as soon as there is a flow of current through the relay 13, and the difference $E_1 - E_2$ equal to $V_{be_1}$ passes quicker towards nil so that the transistor is rendered conductive substantially faster, that is, the device gets tilting effect and simultaneously greater sensitivity to changes or variations in the conductivity of the electrode.

If the pulsating direct current voltage produced by the second rectifier bridge 15 is not smoothed out, for example if the condenser 18 and the series resistor 19 are wholly dispensed with, the differential voltage will be substantially of a curve shape as indicated in FIGURE 3, consisting of the difference between two substantially sinusoidal voltages. If, however, the condenser 18 and the series resistor 19 are selected so that perfect smoothing out of the direct current impulses is obtained, the differential voltage obtained will be substantially of the curve shape indicated in FIGURE 4. In a preferred embodiment of the device according to the invention the direct current source 15 is connected in parallel with a smoothing-out condenser 18 and a resistor 19 connected in series with the condenser which are so dimensioned that their time constant $\tau$ is greater than $T/2$, in which T is the cycle used, as a result of which the relay 13 receives greater attractive force and smaller contact vibrations due to the pulsating current, whereby the sensitivity and the reliability of the device are improved.

What I claim and desire to secure by Letters Patent is:

1. In an electrical moisture sensing device, an electrical circuit comprising, a full-wave bridge rectifier having two sets of alternate junctions comprising a set of A.-C. junctions and a set of D.-C. junctions, a load resistor connected between said D.-C. junctions, an A.-C. source connected across said bridge rectifier to said A.-C. junctions for applying a substantially constant A.-C. voltage to said bridge rectifier, a current-conducting moisture sensor capable of absorbing moisture and having the characteristic of varying in conductivity proportionately to the moisture absorbed and connected to one of said A.-C. junctions in series with said A.-C. source for developing a D.-C. voltage corresponding to a rectified A.-C. voltage applied to said bridge rectifier and variably proportionate to the conductivity of said sensor, an adjustable D.-C. source connected to said bridge rectifier for applying a known second D.-C. voltage to said bridge rectifier of a polarity opposite to the polarity of said first D.-C. voltage to develop a difference voltage between said first and second D.-C. voltages and representative of the change in conductivity of said sensor, and voltage-responsive means connected to said bridge rectifier to respond to said difference voltage, and means for superimposing an A.-C. voltage on said adjustable D.-C. source to improve the accuracy, and sensitivity of the differential values.

2. In an electrical moisture sensing device, an electrical circuit comprising, a full-wave bridge rectifier having two sets of alternate junctions comprising a set of A.-C. junctions and a set of D.-C. junctions, an A.-C. source connected across said bridge rectifier to said A.-C. junctions for applying a substantially constant A.-C. voltage to said bridge rectifier, a current conducting moisture sensor capable of absorbing moisture and having the characteristic of varying in conductivity proportionately to the moisture absorbed and connected to one of said A.-C. junctions in series with said A.-C. source for developing a D.-C. voltage corresponding to a rectified A.-C. voltage applied to said bridge rectifier and variably proportionate to the conductivity of said sensor, an adjustable D.-C. source comprising another full-wave bridge rectifier connected to the first-mentioned bridge rectifier for applying a known pulsating second D.-C. voltage to said first-mentioned bridge rectifier of a polarity opposite to the polarity of said first D.-C. voltage and in opposite phase with said A.-C. voltage to develop a difference voltage between said first and second D.-C. voltages and representative of the change in conductivity of said sensor, and voltage-responsive means connected to said first-mentioned bridge rectifier to respond to said difference voltage.

3. In an electrical moisture sensing device, an electrical circuit comprising, a bridge rectifier having two sets of alternate junctions comprising a set of A.-C. junctions and a set of D.-C. junctions, a load resistor connected between said D.-C. junctions, an A.-C. source connected across said bridge rectifier to said A.-C. junctions for applying a substantially constant A.-C. voltage to said bridge rectifier, a current-conducting moisture sensor capable of absorbing moisture and having the characteristic of varying in conductivity proportionately to the moisture absorbed and connected to one of said A.-C. junctions in series with said A.-C. source, for developing a D.-C. voltage corresponding to a rectified A.-C. voltage applied to said bridge rectifier and variably proportionate to the conductivity of said sensor, an adjustable D.-C. source connected to said bridge rectifier for applying a known second D.-C. voltage to said bridge rectifier of a polarity opposite to the polarity of said first D.-C. voltage to develop a difference voltage between said first and second D.-C. voltages and representative of the change in conductivity of said sensors, voltage-responsive means connected to said bridge rectifier to respond to said difference voltage, and said voltage-responsive means comprising means actuatable to a desired condition in dependence upon the value of said difference voltage.

4. In an electrical moisture sensing device, an electrical circuit comprising, a bridge rectifier having two sets of alternate junctions comprising a set of A.-C. junctions and a set of D.-C. junctions, a load resistor connected between said D.-C. junctions, an A.-C. source connected across said bridge rectifier to said A.-C. junctions for applying a substantially constant A.-C. voltage to said bridge rectifier, a current conducting moisture sensor capable of absorbing moisture and having the characteristic of varying its conductivity proportionate to the moisture absorbed and disposed connected to one of said A.-C. junctions in series with said A.-C. source, for developing a D.-C. voltage corresponding to a rectified A.-C. voltage applied to said bridge rectifier and variably proportionate to the conductivity of said sensor, an adjustable D.-C. source comprising a resistive voltage divider having a movable contact connected to said bridge rectifier for applying a known second D.-C. voltage to said bridge rectifier of a polarity opposite to the polarity of said first D.-C. voltage to develop a difference voltage between said first and second D.-C. voltages and representative of the change in conductivity of said sensor, voltage-responsive means connected to said bridge rectifier to respond to a difference voltage comprising, a D.-C. amplifier circuit comprising a first transistor having a collector and a base connected to said rectifier bridge, a second transistor having a base, connections connecting the collector of said first transistor to the base of said second transistor, a relay connected to respond to an amplified output of said second transistor and a power supply common to said transistors and said adjustable D.-C. source, and said D.-C. source having such high internal impedance that a substantial voltage drop is caused between the terminals of said D.-C. source, when said second transistor is conducting.

5. In an electrical moisture sensing device according to claim 4, in which said adjustable D.-C. source comprises a full-wave bridge rectifier and said power supply comprises an A.-C. power supply connected across said full-wave bridge rectifier, and further including a resistor and a capacitor connected across D.-C. junctions on said full-wave bridge rectifier.

No references cited.

WALTER L. CARLSON, *Primary Examiner.*